United States Patent
Shin

(10) Patent No.: US 7,606,005 B2
(45) Date of Patent: Oct. 20, 2009

(54) CONNECTION STRUCTURE FOR ACTUATOR AND FLEXIBLE PRINTED CIRCUIT OF HARD DISK DRIVE

(75) Inventor: Sang-chul Shin, Osan-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 500 days.

(21) Appl. No.: 11/304,791

(22) Filed: Dec. 16, 2005

(65) Prior Publication Data

US 2006/0132981 A1 Jun. 22, 2006

(30) Foreign Application Priority Data

Dec. 17, 2004 (KR) .................. 10-2004-0107997

(51) Int. Cl.
*G11B 5/55* (2006.01)
(52) U.S. Cl. .................................. 360/264.2
(58) Field of Classification Search ............. 360/264.2
See application file for complete search history.

(56) References Cited

U.S. PATENT DOCUMENTS

| 5,495,377 | A | * | 2/1996 | Kim | 360/264.2 |
| 5,818,667 | A | * | 10/1998 | Larson | 360/264.2 |
| 5,986,362 | A | | 11/1999 | Sukagawa et al. | 310/12 |
| 6,724,578 | B2 | * | 4/2004 | Watanabe | 360/264.2 |
| 7,245,458 | B2 | * | 7/2007 | Zhang et al. | 360/264.2 |
| 2003/0189796 | A1 | * | 10/2003 | Hayakawa et al. | 360/264.2 |
| 2005/0254176 | A1 | * | 11/2005 | McReynolds et al. | 360/264.2 |

FOREIGN PATENT DOCUMENTS

| JP | 04-302872 | 10/1992 |
| JP | 06-223514 | 8/1994 |
| JP | 07-031118 | 1/1995 |
| JP | 07-334945 | 12/1995 |

* cited by examiner

*Primary Examiner*—A. J. Heinz
(74) *Attorney, Agent, or Firm*—Staas & Halsey LLP

(57) ABSTRACT

An actuator of a hard disk drive (HDD). The actuator includes an actuator arm installed to be rotatably connected to a base plate of the HDD and having a pivot hole, a VCM (voice coil motor) coil connected to a rear portion of the actuator arm, upper and lower yokes respectively installed upper and lower the VCM coil, a VCM motor having a magnet provided therebetween; and a flexible printed circuit for driving the actuator. Here, a boss is formed at the actuator arm to be face the base plate and to be connected to the flexible printed circuit.

10 Claims, 7 Drawing Sheets

CONNECTION STRUCTURE FOR ACTUATOR AND FLEXIBLE PRINTED CIRCUIT OF HARD DISK DRIVE

CROSS-REFERENCE TO RELATED APPLICATIONS

This application claims the benefit of Korean Patent Application No. 10-2004-0107997, filed on Dec. 17, 2004, in the Korean Intellectual Property Office, the disclosure of which is incorporated herein by reference.

BACKGROUND OF THE INVENTION

1. Field of the Invention

The present invention relates to a hard disk drive (HDD), and more particularly, to an actuator of an HDD, which can improve a connection structure for the actuator and a flexible printed circuit and can reduce an electromagnetic interference (EMI) of a voice coil motor.

2. Description of Related Art

An HDD is one type of auxiliary memory device for a computer, which reproduces/records data from/on a disk by using a read/write head.

FIG. 1 is a schematic plan view of a conventional HDD, and FIG. 2 is an exploded perspective view of a conventional actuator.

Referring to FIGS. 1 and 2, the HDD includes at least one or more data storing disks 20, a spindle motor 30 installed on a base plate 10 to rotate the disk 20, and an actuator 40 having a read/write head 41 for reproducing/recording data from/on the disk 20.

The disks 20 are installed to be spaced apart from one another by a predetermined interval and to be rotatable by the spindle motor 30.

The actuator 40 is installed to be rotatable on a pivot 47 provided on the base plate 10. The actuator 40 has an actuator arm 46, and the actuator arm 46 has at its center portion a pivot hole 48 for rotatably connecting the actuator arm 46 to the pivot 47. A suspension 44 is installed at one end portion of the actuator arm 46 to elastically bias a slider 42 mounting the read/write head 41 toward a surface of the disk 20. A voice coil motor (VCM) 50 is provided in the actuator 40 to supply a driving force for rotating the actuator arm 46. The voice coil motor 50 has a VCM coil 56 connected to a rear end portion 57 of the actuator arm 46. A lower yoke 51 is fixedly installed on the base plate 10 under the VCM coil 56 to be spaced apart from the VCM coil 56 by a predetermined interval. An upper yoke 52 is installed over the VCM coil 56 and is connected to the lower yoke 51 with screws 59. Magnets 53 and 54 are respectively attached to the lower and upper yokes 51 and 52, and are respectively spaced apart from the VCM coil 56 by predetermined intervals.

In the so-constructed conventional HDD, during the data reproducing/recoding operation, a lift force caused by the rotation of the disk 20 and an elastic force due to the suspension 44 are applied to the slider 42 mounting the read/write head 41. Accordingly, the slider 42 maintains its lift state at a constant height from a data zone 22 of the disk 20 by a resultant force of the lift force and the elastic force, and the head 41 mounted on the slider 42 reproduces/records data from/on the disk 20 while maintaining a constant interval from the rotating disk 20.

In a small mobile HDD, a lead wire is soldered to the actuator arm 46, the method of which will now be described in detail with reference FIG. 3. However, this soldering method is difficult to be performed and may degrade the performance of the HDD due to a possible electrical short.

FIG. 3 is a plan view of a lead wire connected to an actuator arm of a conventional HDD, which is disclosed in U.S. Pat. No. 5,734,528.

Referring to FIG. 3, a lead wire 71 is connected to a VCM coil 56 provided at a rear end portion 57 of an actuator 40, and a sleeve 70 for insulation is formed on the connected portion. The lead wire 71 is diverged from a flexible printed circuit. The lead wire 71 transmits an electrical signal, which is outputted from a controller (not shown) of the HDD, to the VDM coil 56. Power is accordingly applied to the VCM coil 56, whereby a driving force for the actuator 40 is generated.

In the conventional HDD, a space between the actuator 40 and a cover plate provided over the actuator 40 is narrower than a space between the actuator 40 and a base plate 10 provided under the actuator 40. This space structure makes it important to make efficient use of a space in the small mobile HDD. Due to such a space restriction, the lead wire 71 is connected to the actuator 40 through a soldering technique. In the soldering technique, after a sheath of an end portion (to which the actuator is to be connected) of the lead wire 71 is removed using chemicals such as sulfuric acid, the sheath-removed end portion of the lead wire 71 is plated with tin for easy soldering.

However, the sheath-removing process needs a lot of time because it is manually performed. Also, the tin-plating process is dangerous for a worker because it includes a step of dipping the sheath-removed end portion into hot tin plating bath of 200° C. or above. Further, during the tin-plating process, the hot tin plating bath is undesirably pulled up along the lead wire 71 by its surface tension to thereby burn an unremoved sheath of the lead wire 71. Furthermore, the hot tin plating bath may splash against the unremoved sheath of the lead wire 71, whereby undesirable splashes may remain on the unremoved sheath.

Ashes caused by the above burning and splash results in the pollution of the interior of an assembled HDD. Moreover, when the splashes penetrate the sheath of the lead wire 71, an electrical short may be induced by the contact of the penetrated splashes. The induced electrical short deteriorates the reliability of the HDD.

Accordingly, there is required an improved method for connecting the lead wire 71 to the actuator 40.

BRIEF SUMMARY

An aspect of the present invention provides an actuator of an HDD, which makes it possible to easily manufacture the HDD, to enhance the reliability of the HDD and to reduce an EMI of a VCM coil, by connecting a lead wire to the actuator through a boss structure and improving a formation position of the boss structure.

According to an aspect of the present invention, there is provided an actuator of a HDD including an actuator arm rotatably connected to a base plate of the HDD and having a pivot hole, a VCM (voice coil motor) coil connected to a rear portion of the actuator arm, upper and lower yokes respectively installed above and below the VCM coil, a VCM motor having a magnet provided therebetween; and a flexible printed circuit for driving the actuator. A boss is formed at the actuator arm to be face the base plate and to be connected to the flexible printed circuit.

According to another aspect of the present invention, there is provided a hard disk drive (HDD), including: an actuator arm; a voice coil motor (VCM) coil connected to a rear portion of the actuator arm; a boss extending from the rear portion of the actuator arm, connected to the VCM coil, and to which a lead wire is connected; and a clip forming a slot between the clip and the rear portion of the actuator arm, the slot retaining the lead wire.

According to another aspect of the present invention, there is provided an actuator, including: a voice coil motor (VCM) coil connected to a rear portion of an actuator arm; an upper yoke disposed above the VCM coil and having a step-type protrusion formed on an inner surface thereof; a lower yoke disposed below the VCM coil; and a VCM motor having a magnet provided between the yokes. The step-type protrusion is proximate to a neutral line of the magnet so as to block a leakage flux from the magnet.

According to another aspect of the present invention, there is provided a method of assembling an actuator, including: inserting a lead wire into a slot formed between a clip attached to a rear portion of an actuator arm and the actuator arm, the lead wire connected at an end to a flexible printed circuit; connecting another end of the lead wire to a boss extending from the rear portion of the actuator arm and connected to a voice coil motor (VCM) coil.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENT

Figure 1:
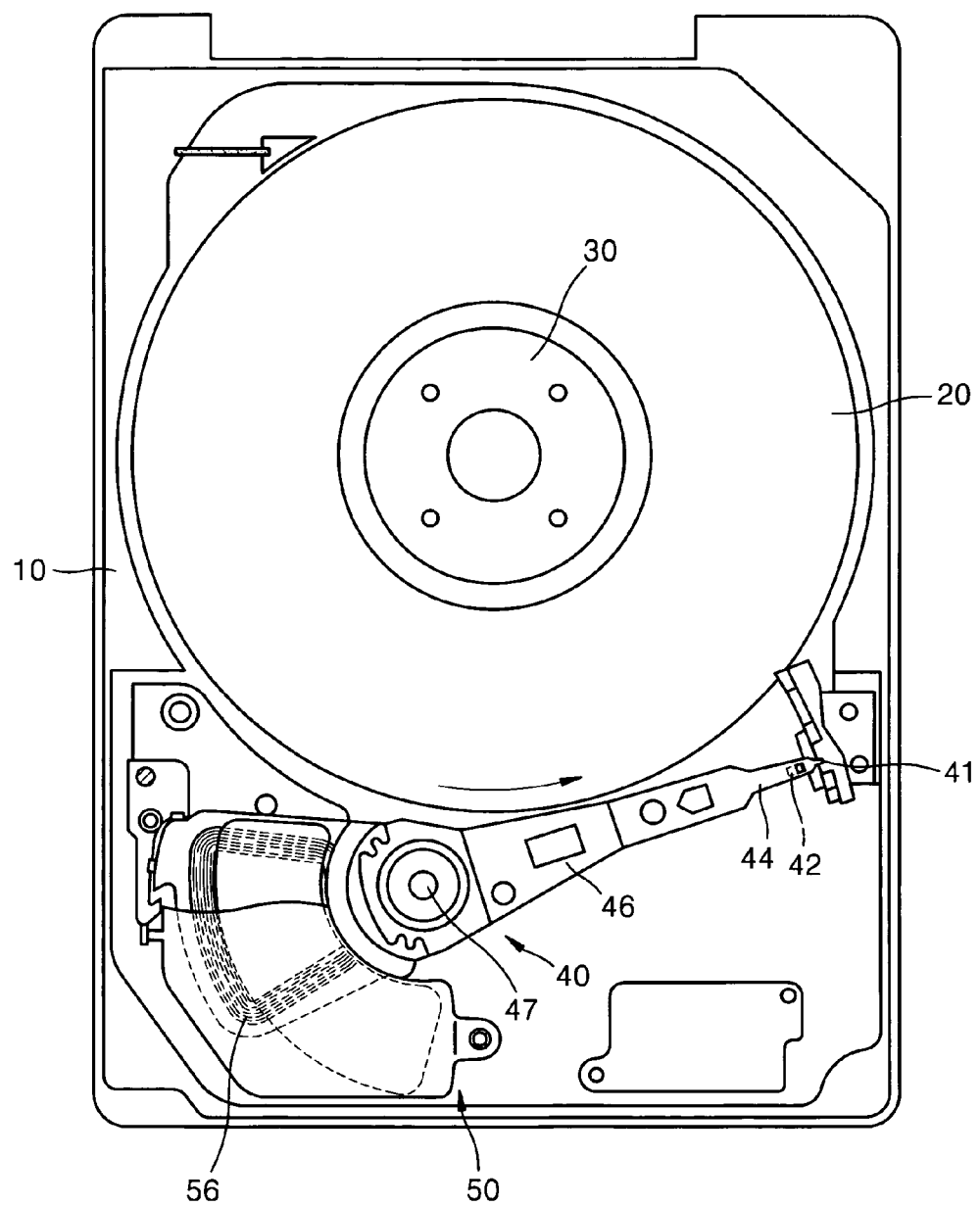
FIG. 1 is a schematic plan view of a conventional HDD.
Figure 2:
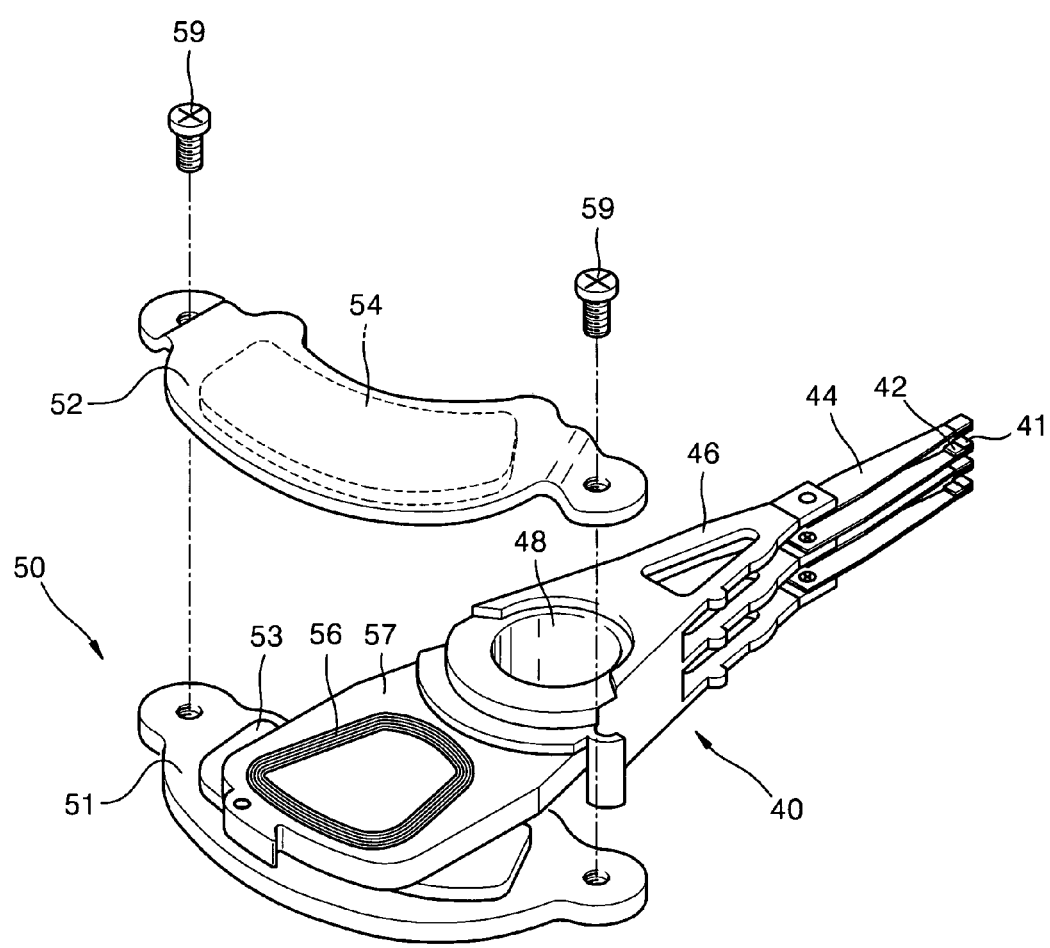
FIG. 2 is an exploded perspective view of a conventional actuator.
Figure 3:
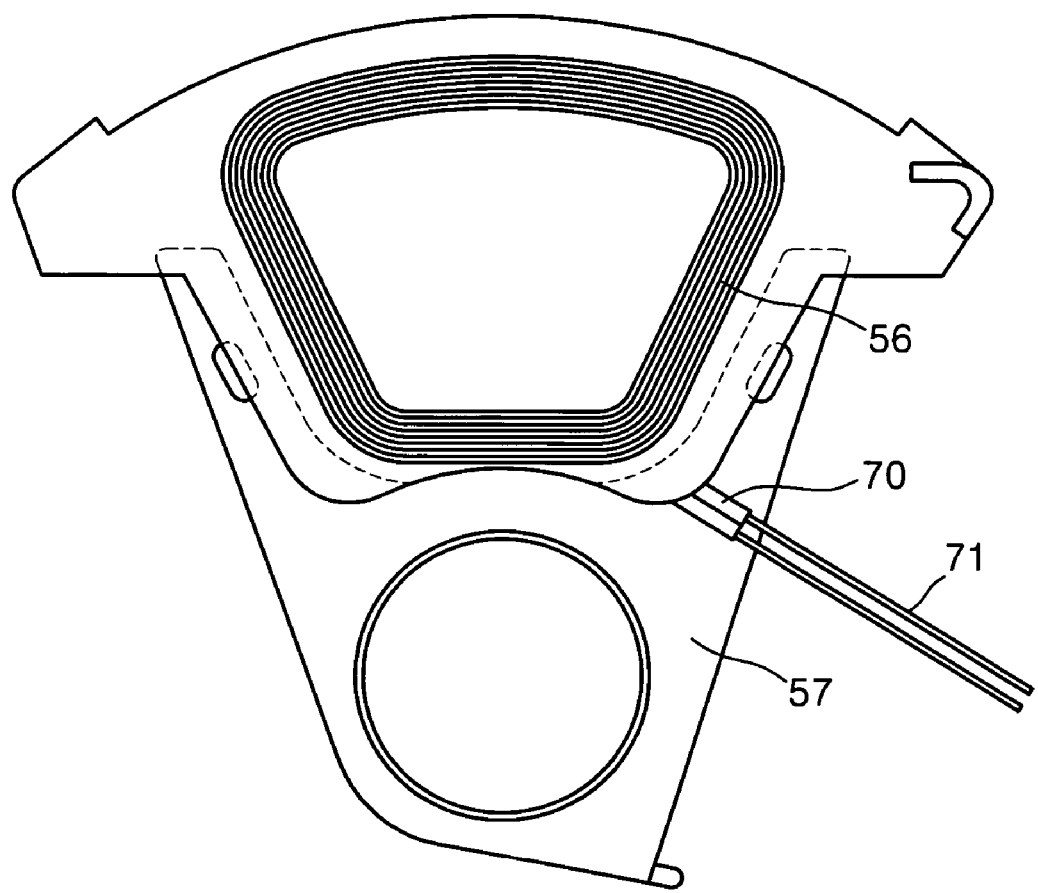
FIG. 3 is a partial plan view illustrating a state where a lead wire is connected to an actuator of a conventional HDD.

Reference will now be made in detail to an embodiment of the present invention, examples of which are illustrated in the accompanying drawings, wherein like reference numerals refer to the like elements throughout. The embodiment is described below in order to explain the present invention by referring to the figures.

Figure 4:
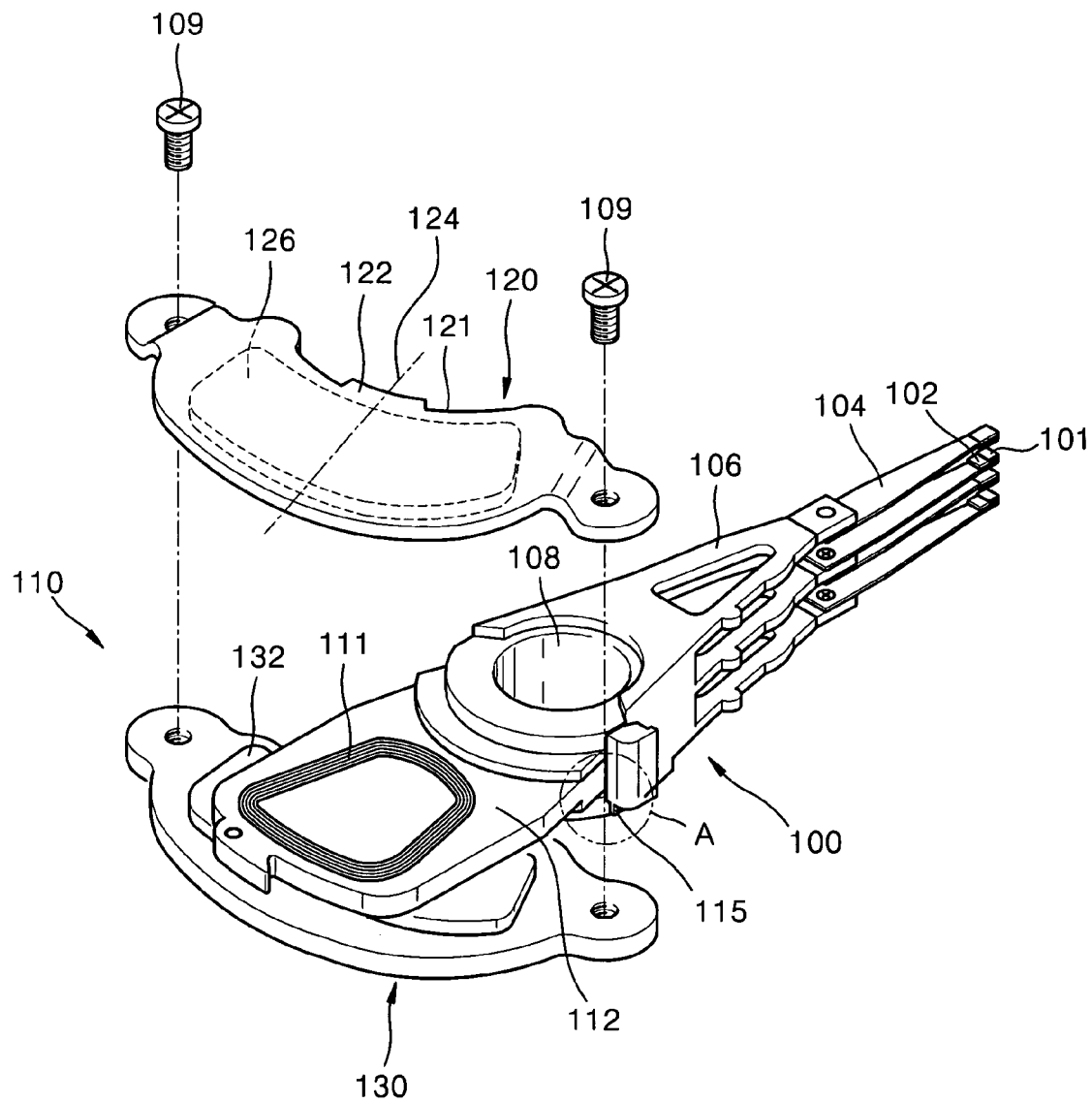
FIG. 4 is an exploded perspective view of an actuator arm of an HDD according to an embodiment of the present invention.

FIG. 4 is an exploded perspective view of an actuator arm of an HDD according to an embodiment of the present invention.

Referring to FIG. 4, the HDD includes an actuator 100 having a read/write head 101 for reproducing/recording data from/on a disk.

The actuator 100 has an actuator arm 106, and the actuator arm 106 has at its center portion a pivot hole 108 for rotatably connecting the actuator arm 108 to a pivot provided on a base plate. A suspension 104 is installed at one end portion of the actuator arm 108 to elastically bias a slider 102 mounting the read/write head 101 toward a surface of the disk. The actuator 100 has a voice coil motor (VCM) 110 for supplying a driving force for rotating the actuator arm 106. The VCM 110 includes a VCM coil 111 connected to a rear end portion 112 of the actuator arm 106, a lower yoke 130 installed under the VCM coil 111 to be spaced apart from the VCM coil 111 by a predetermined interval, and an upper yoke 120 installed over the VCM coil 111 to be spaced apart from the VCM coil 111. The lower yoke 130 is installed on the base plate of the HDD, and the upper yoke 120 is connected to the lower yoke 130 with screws 109. Magnets 132 and 126 are respectively attached to the lower and upper yokes 130 and 120, and are respectively spaced apart from the VCM coil 111 by predetermined intervals. A reference numeral 124 denotes a neutral line dividing the N and S poles of the magnet 126.

The upper yoke 120 has a step-type protrusion 122 formed on its inner surface 121 facing the pivot hole 108 so as to reduce an EMI generated at the VCM 110, which will be described later with reference to FIG. 7.

The actuator 100 uses a boss structure having an improved formation position so as to connect a lead wire thereto, which will be described later with reference to FIGS. 5 and 6.

Figure 5:
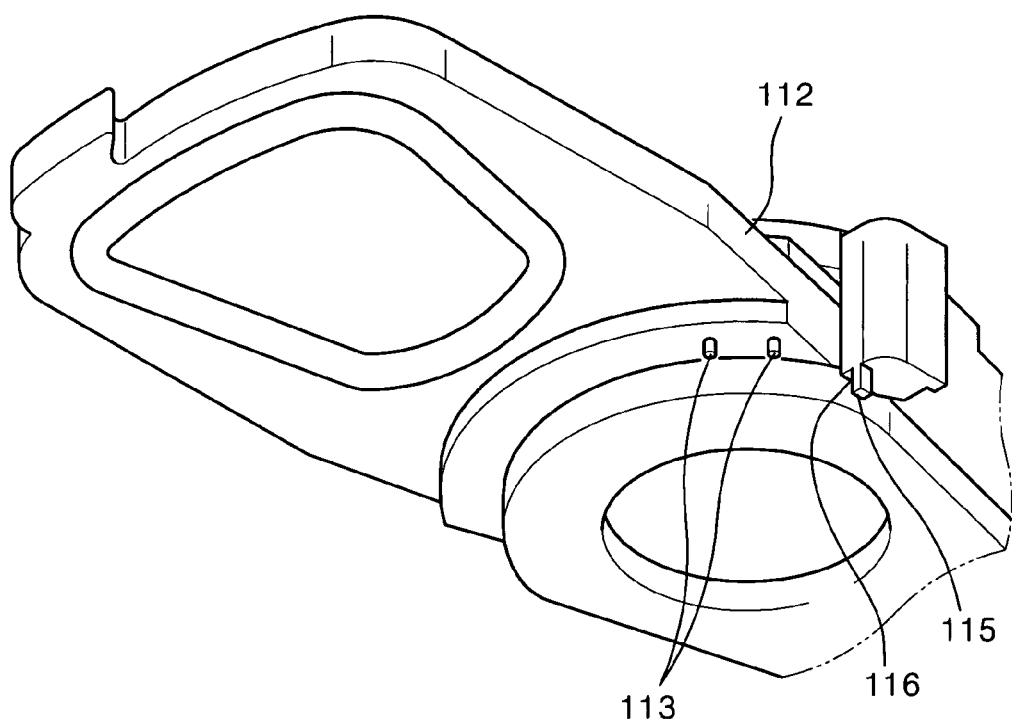
FIG. 5 is an enlarged rear perspective view of a portion "A" shown in FIG. 4.
Figure 6:
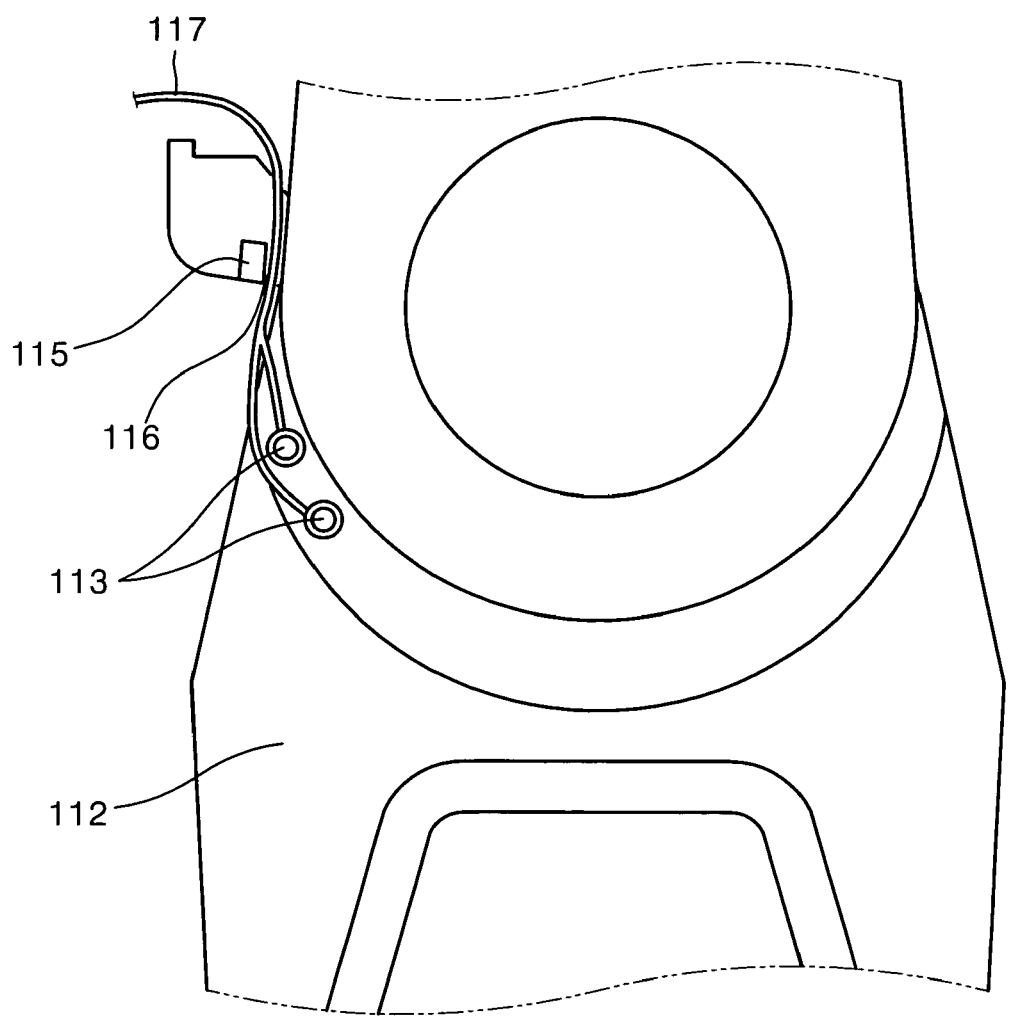
FIG. 6 is an enlarged rear view of a portion "A" shown in FIG. 4.

FIG. 5 is an enlarged rear perspective view of a portion "A" shown in FIG., and FIG. 6 is an enlarged rear view of the portion "A".

Referring to FIGS. 5 and 6, the actuator 100 includes a boss 113 formed on a lower surface of the actuator arm 106, a slot 116 formed spaced apart from the boss 113 by a predetermined interval, and a clip 115 forming the slot 116.

The boss 113 is formed to face the base plate. A lead wire 117 is soldered to the boss 113. The lead wire 117 is diverged from a flexible printed circuit, and applies a power source to the VCM coil 111 to thereby generate a driving force for rotating the actuator arm 106.

The lead wire 117 is connected to the boss 113 and the connected portion is soldered, whereby the lead wire 117 can be connected to the VCM coil 111. Accordingly, the present embodiment can avoid the difficulty in the soldering process, the electrical short, and the pollution of the interior of an HDD that are caused by the conventional soldering technique.

Also, the boss 113 is formed on a lower surface of the actuator arm 106. Accordingly, a space between the actuator 100 and the base plate (not shown) provided under the actuator 100 becomes larger than a space between the actuator arm 106 and a cover plate (not shown) provided over the actuator arm 106. The lead wire 117 can be connected to the VCM coil 111 through the larger space between the actuator 100 and the base plate, whereby the usability of an inner space of the HDD.

Since the boss 113 is used for connecting the VCM coil 111 and the lead wire 117, the boss 113 is preferably positioned at a portion adjacent to the VCM coil 11 out of a lower side of a rear portion 112 of the actuator arm 106.

Preferably, a diameter of the boss 113 is substantially 0.5 mm so as to prevent an interference with the lower yoke 130 by reducing a line width of the lead wire 117 soldered and to the boss 113 and to facilitate a balancing design of the actuator 100.

The actuator arm 106 includes the slot 116 and the clip 115 for forming the slot 116. The lead wire 117 connected to the boss 113 is inserted into and guided by the slot 116. Since the lead wire 117 is diverged from the flexible printed circuit and thus be fundamentally flexible, the posture of the lead wire 117 and the position thereof with respect to the actuator arm 106 are frequently changed during the rotation of the actuator arm 106. Accordingly, a fatigue failure may be generated at the connection portion of the lead wire 117 and the boss 113.

Also, the lead wire 117 may interfere the rotation of the actuator arm 106 because it is not fixed. In the present invention, the lead wire 117 is guided by the slot 116, whereby the posture of the lead wire 117 and the position thereof with respect to the actuator arm 106 can be constantly maintained. Accordingly, the fatigue failure and the interference of the rotation of the actuator arm 106 can be prevented.

Here, since the boss 113 is formed on a lower portion of the actuator arm 106, the slot 116 guiding the lead wire 117 is preferably formed at the lower portion of the actuator arm 106. Also, in order to enhance the guiding effect, the slot 116 is preferable formed on the lower portion of the actuator arm 106 to be spaced apart from the boss 113 by a given interval. Further, for simplicity in a manufacturing process, the clip 115 is preferably integrally formed with the actuator arm 106.

Figure 7:
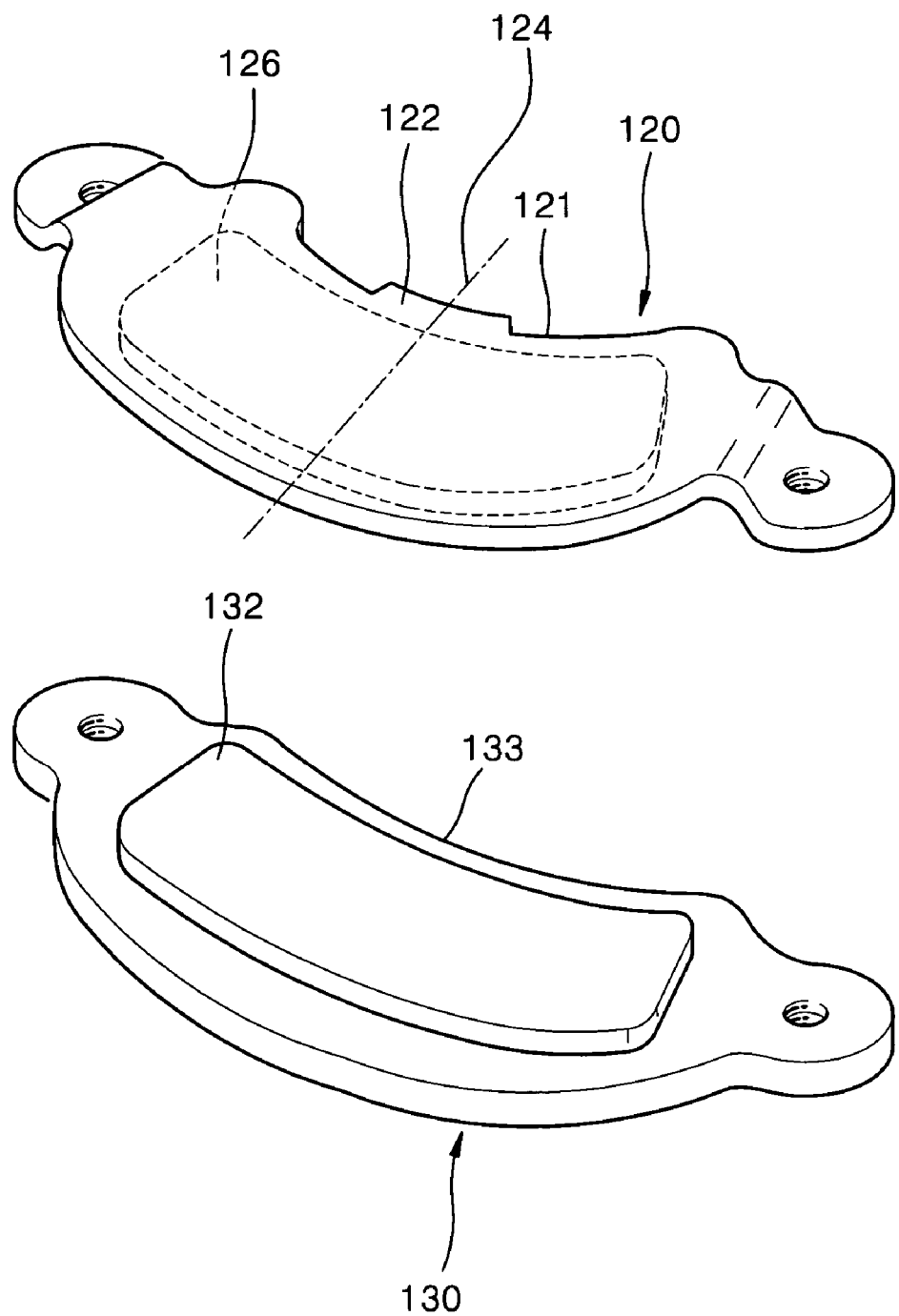
FIG. 7 is an exploded perspective view of upper and lower yokes of an actuator according to an embodiment of the present invention.

FIG. 7 is an exploded perspective view of upper and lower yokes of an actuator according to an embodiment of the present invention.

Referring to FIG. 7, the VCM 110 of the actuator 100 of FIG. 4 includes the upper yoke 120 installed over the VCM coil 111 to be spaced apart from the VCM coil 111 by a given interval, and the lower yoke 130 installed under the VCM coil 111 to be spaced apart from the VCM coil 111 by a given interval. The magnets 126 and 132 facing the VCM coil 111 are attached respectively to the upper and lower yokes 120 and 130.

The upper yoke 120 has the step-type protrusion 122 formed on its inner surface 121 facing the pivot hole 108 so as to reduce an EMI generated at the VCM 110.

The upper and lower yokes 120 and 130 preferably have respective inner rounding surfaces 121 and 133 having the same curvature radius.

The step-type protrusion 122 is preferably symmetrical with respect to the neutral line 124. The neutral line 124 is a boundary line between the N and S poles of the magnet 126. The N and S poles of the magnet 126 are formed in the same plane so that the actuator arm 106 can be rotated in the same direction by the Fleming's left-hand rule when the direction of a current flowing through the VCM coil 111 is changed during the rotation of the actuator arm 106. When the VCM coil 111 is positioned at the neutral line in the magnet 126, the linearity of the VCM 110 is distorted. In detail, the linearity of the VCM 110 means that a magnetic field is uniformly distributed over the total area of the magnets 126 and 132. When the VCM coil 111 is positioned at the neutral line 124 where the magnet 126 has a neutral polarity, a leakage flux is generated in the direction of the cover plate. The actuator arm 106 cannot be easily controlled because it cannot be smoothly rotated due to the leakage flux, whereby the linearity of the VCM 110 is distorted. In the present embodiment, the step-type protrusion 122 is formed on the inner surface 121 near the neutral line 124 and the so-formed protrusion 122 blocks the leakage flux (magnetic force line), thereby focusing the magnetic force of the magnet 126. In this manner, the leakage flux in the direction of the cover plate can be minimized. Accordingly, an EMI in the direction of the cover plate can be reduced, and the linearity of the VCM 110 can be enhanced.

Here, the inner surface 121 of the upper yoke 120 has the step-type protrusion 122 formed thereat but the inner surface 133 of the lower yoke 130 does not has the step-type protrusion 122. This aims at preventing the rotation of the actuator arm 106 from being disturbed because the boss 113 is caught by the inner surface 133 during the rotation of the actuator arm 106.

As stated above, in the above-described embodiment of the present invention connect the lead wire and the VCM coil by using a boss structure and forms the boss structure on a lower surface of the actuator arm, thereby making it possible to prevent the difficulty in the soldering process, the electrical short, and the pollution of the interior of an HDD that are caused by the conventional soldering technique. Accordingly, the above-described embodiment of the present invention makes it possible to enhance the reliability of the HDD and to easily perform a manufacturing process of the HDD.

Also, the above-described embodiment of the present invention make it possible to improve the usability of the inner space of the HDD because the boss is formed at the lower portion of the actuator arm and thus the space between the actuator and the base plate becomes relatively larger than that of the conventional art.

Further, the above-described embodiment of the present invention make it possible to reduce an EMI in the direction of the cover plate of the HDD and to enhance the linearity of the VCM because the step-type protrusion form at the upper yoke of the VCM can minimize the leakage flux.

Although an embodiment of the present invention have been shown and described, the present invention is not limited to the described embodiment. Instead, it is to be appreciated that changes may be made to the embodiment without departing from the principles and spirit of the invention, the scope of which is defined by the claims and their equivalents.

What is claimed is:

1. An actuator of a hard disk drive (HDD), comprising:
an actuator arm rotatably connected to a base plate of the HDD and having a pivot hole;
the actuator arm having a lower surface generally parallel to and facing the base plate;
a voice coil motor (VCM) coil connected to a rear portion of the actuator arm;
upper and lower yokes respectively installed above and below the VCM coil;
a VCM motor having a magnet provided between the yokes;
a flexible printed circuit for supplying power to drive the actuator; and
a boss formed on the lower surface of the actuator arm and positioned between the actuator arm and the base plate for electrically connecting to the flexible printed circuit.

2. The actuator of claim 1, wherein the boss is formed adjacent to the VCM coil.

3. The actuator of claim 1, wherein the upper yoke includes a step-type protrusion formed on an inner surface thereof facing the pivot hole.

4. The actuator of claim 3, wherein the inner surface of the upper yoke and an inner surface of the lower yoke have a same curvature radius.

5. The actuator of claim 3, wherein the step-type protrusion is symmetrical with respect to a neutral boundary line between N and S poles of the magnet.

6. The actuator of claim 1, wherein a diameter of the boss is substantially 0.5 mm.

7. The actuator of claim 1, wherein the actuator arm includes a slot guiding the flexible printed circuit connected to the boss.

8. The actuator of claim 7, wherein the slot is formed at a lower portion of the actuator arm to be spaced apart from the boss by a predetermined interval.

9. The actuator of claim 7, wherein the actuator arm includes a clip forming the slot.

10. The actuator of claim 9, wherein the clip is formed in a body with the actuator arm.

* * * * *